United States Patent
Qiao

(10) Patent No.: US 10,379,288 B2
(45) Date of Patent: Aug. 13, 2019

(54) METHOD AND DEVICE HAVING A SATURABLE ABSORBER FOR FILTERING

(71) Applicant: Lijie Qiao, Nepean (CA)

(72) Inventor: Lijie Qiao, Nepean (CA)

( * ) Notice: Subject to any disclaimer, the term of this patent is extended or adjusted under 35 U.S.C. 154(b) by 0 days.

(21) Appl. No.: 15/834,729

(22) Filed: Dec. 7, 2017

(65) Prior Publication Data
US 2018/0292606 A1    Oct. 11, 2018

Related U.S. Application Data

(60) Provisional application No. 62/482,712, filed on Apr. 7, 2017.

(51) Int. Cl.
*G02B 6/12* (2006.01)
*G02B 6/293* (2006.01)

(52) U.S. Cl.
CPC ........... *G02B 6/12* (2013.01); *G02B 6/29308* (2013.01); *G02B 6/29317* (2013.01); *G02B 2006/12109* (2013.01); *G02B 2006/12126* (2013.01); *G02B 2006/12164* (2013.01)

(58) Field of Classification Search
CPC .................................. G02B 6/12; G02B 6/293
USPC .......................................................... 385/14
See application file for complete search history.

(56) References Cited

U.S. PATENT DOCUMENTS

| | | | | |
|---|---|---|---|---|
| 6,097,741 A * | 8/2000 | Lin | ................. | H01S 3/067 372/6 |
| 6,144,783 A * | 11/2000 | Epworth | ............ | G02B 6/12014 385/24 |
| 6,167,169 A * | 12/2000 | Brinkman | ............... | G02F 1/011 385/10 |
| 6,198,864 B1 * | 3/2001 | Lemoff | ............. | G02B 6/29367 385/24 |
| 6,418,152 B1 * | 7/2002 | Davis | ................... | H01S 5/4062 372/101 |
| 2003/0025917 A1 * | 2/2003 | Suhami | .................. | A61B 3/102 356/601 |
| 2011/0122895 A1 * | 5/2011 | Savage-Leuchs | .......................... | H01S 3/06716 372/10 |
| 2013/0058370 A1 * | 3/2013 | Chang-Hasnain | ..... | B82Y 20/00 372/50.11 |
| 2014/0085639 A1 * | 3/2014 | Johnson | ............. | G01B 9/02004 356/479 |
| 2015/0029572 A1 * | 1/2015 | Vail | ..................... | G02B 26/0833 359/223.1 |
| 2016/0041095 A1 * | 2/2016 | Rothberg | ........... | G01N 21/6408 506/4 |

* cited by examiner

*Primary Examiner* — Kaveh C Kianni
(74) *Attorney, Agent, or Firm* — Teitelbaum Bouevitch & McLachlen; Neil Teitelbaum

(57) ABSTRACT

A self-fit optical filter includes a dual fiber collimator, a diffraction grating for spatially dispersing the input light beam into a plurality of sub-beams, a cylindrical lens for focusing each of the sub-beams at a saturable absorber which becomes saturated dependent on intensity of light, and a reflector for reflecting the sub-beams back along their optical paths. A method of filtering includes: demultiplexing an input beam into a plurality of sub-beams having distinct center wavelengths, at least partially absorbing one or more of the sub-beams by using a saturable absorber while allowing other sub-beams to pass through, substantially unattenuated, and multiplexing the sub-beams into an output optical signal.

14 Claims, 8 Drawing Sheets

---

Demultiplexing an input optical signal into a plurality of sub-signals.

↓

Absorbing one or more of the plurality of sub-beams, by using a saturable absorber

↓

Multiplexing the sub-beams into an output optical signal.

METHOD AND DEVICE HAVING A SATURABLE ABSORBER FOR FILTERING

CROSS-REFERENCE TO RELATED APPLICATIONS

The present application claims priority from U.S. Patent Application No. 62/482,712 filed Apr. 7, 2017, which is incorporated herein by reference for all purposes.

TECHNICAL FIELD

The disclosure relates to the field of optical communication and, more particularly, to filtering of optical signals.

BACKGROUND OF THE INVENTION

In an optical communication system, wavelength-division multiplexing (WDM) is employed for combining several optical carrier signals of different wavelength into a single beam which can then be propagated through a single optical fiber. In practice, channels with close wavelengths may affect one another if they are not sufficiently isolated.

The adjacent channel isolation (AJCI) parameter reflects the remaining power of a dropped channel in the optical fiber. It is one of the key parameters for a wavelength selective switch (WSS) in a reconfigurable optical add/drop multiplex (ROADM) system.

In some instances, it may be desirable to increase the amount of data passed through a communication system by using more channels, or more distinct wavelengths, within a single fiber. However, increasing the number of ports in a WSS usually leads to a drop in the AJCI. By way of example, a WSS with less than 1×9 ports has about 25 dB AJCI and barely meets the requirements.

Accordingly, it is desirable to solve a problem of cleaning or removing remaining power in dropped channels.

SUMMARY OF THE INVENTION

The instant disclosure provides an optical circuit including: a demultiplexer disposed to receive an input light beam for spatially dispersing the input light beam into a plurality of sub-beams, dependent on wavelengths and a saturably-absorbing circuit disposed to receive the plurality of sub-beams for forming an output beam. The saturably-absorbing circuit includes a saturable absorber, which becomes saturated dependent on intensity of light, at least for light having wavelength within a particular range so that a coefficient of absorption for any sub-beam with intensity within a first interval of intensities is at least four times less than a coefficient of absorption for any sub-beam with intensity within a second interval of intensities, wherein the first interval is above the saturation threshold and the second interval is below the saturation threshold. The saturably-absorbing circuit further includes either a reflector for reflecting the plurality of sub-beams back along their optical paths, wherein the demultiplexer combines the plurality of sub-beams into the output beam, or a multiplexer disposed to receive the plurality of sub-beams for combining the plurality of sub-beams into the output beam.

The disclosure also provides a method which includes: (a) demultiplexing an input beam into a plurality of sub-beams having distinct center wavelengths; (b) at least partially absorbing one or more of the plurality of sub-beams by using a saturable absorber, and allowing a plurality of other sub-beams to pass, substantially unattenuated, wherein the saturable absorber becomes saturated dependent on intensity of light, at least for light having wavelength within a particular range, so that a coefficient of absorption of the saturable absorber for any sub-beam with intensity within a first interval of intensities is at least four times less than a coefficient of absorption for any sub-beam with intensity within a second interval of intensities, wherein the first interval is above the saturation threshold and the second interval is below the saturation threshold; and, (c) multiplexing the plurality of sub-beams into an output optical signal.

One aspect of the disclosure relates to an optical circuit which may serve as a self-fit optical filter, including: a dual fiber collimator for collimating input light so as to form an input light beam; a diffraction grating disposed to receive the input light beam for spatially dispersing the input light beam into a plurality of sub-beams, dependent on wavelengths; a cylindrical lens for focusing each of the plurality of sub-beams substantially at the saturable absorber; a saturable absorber becomes saturated dependent on intensity of light, at least for light having wavelength within a particular range, so that a coefficient of absorption for any sub-beam with intensity within a first interval of intensities is at least four times less than a coefficient of absorption for any sub-beam with intensity within a second interval of intensities, wherein the first interval is above the saturation threshold and the second interval is below the saturation threshold; and, a reflector for reflecting the plurality of sub-beams back along their optical paths, wherein the dual fiber collimator combines the plurality of sub-beams into an output optical signal.

Another aspect of the disclosure relates to a Wavelength Selective Switch (WSS), which includes: a demultiplexer array (DeMux), a switch array, an output multiplexer (Mux) array, and a saturable absorber disposed between the switch array and the Mux array, wherein, the saturable absorber becomes saturated dependent on intensity of light, at least for light having wavelength within a particular range, so that a coefficient of absorption for any sub-beam with intensity within a first interval of intensities is at least four times less than a coefficient of absorption for any sub-beam with intensity within a second interval of intensities, wherein the first interval is above the saturation threshold and the second interval is below the saturation threshold.

BRIEF DESCRIPTION OF THE DRAWINGS

Exemplary embodiments will now be described in conjunction with the drawings in which.

DETAILED DESCRIPTION OF THE INVENTION

A self-fit optical filter circuit may be used for cleaning the unwanted remaining power of a dropped channel in a Wavelength Division Multiplexing (WDM) system.

The filter circuit includes a demultiplexing component which spatially separates channels based on their wavelengths and thus provides a plurality of sub-beams. A saturable absorber (SA) performs the "cleaning" of one or more dropped or missing channels, where the received signal is low. Saturable absorbers exhibit non-linear absorption, dependent of the intensity of incident light. The low power channels, possibly remnants of channels that have been dropped, are "cleaned" using the high absorption of the SA for low intensity light. However, for the high power channels that carry data the SA is practically transparent. The filter may include a reflector which reflects the cleaned signals back along the optical path of the incident light, making the filter a self-fit filter.

Figure 1:
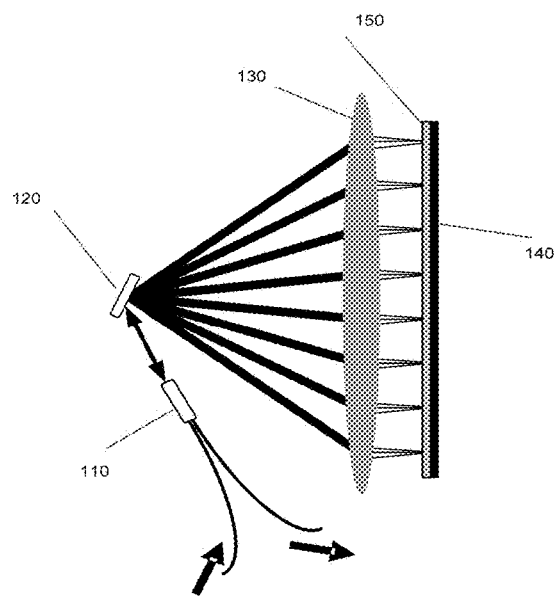
FIG. 1 is a schematic representation of a self-fit filter.

The filter may include a collimator for providing a collimated input beam of light. FIG. 1 illustrates a self-fit filter with a collimator 110. Alternatively, the input beam may be collimated externally to the filter, e.g. by a collimating lens built into the end of fibre.

Preferably, the collimator is a dual fiber collimator, i.e. it includes an input fiber and an output fiber. The input fiber may be used as an input port and receive an input signal from an optical system such as a WDM system. The output fiber may be used as an output port for providing the cleaned signal back to the system.

The collimator receives light with the input signal, forms a collimated beam, and may direct the collimated beam towards a demultiplexing component (DeMux). The Demux is disposed to receive an input light beam, possibly directly or indirectly from the optional collimator. The demultiplexing circuit separates channels of the multi-wavelength input light beam in space into a plurality of spatially dispersed sub-beams. Directions of the sub-beams depend on the center wavelengths of light forming each of the sub-beams. The center wavelengths are distinct from one sub-beam to another. The filter may include one or more collimators, e.g. in the form of an array of collimators as illustrated by the array 111 shown in FIGS. 1A and 3. With reference to FIG. 1, the filter may include one or more collimators 110. The embodiment which includes more than one collimator in the form of the collimator array 111 is illustrated in a 3D drawing in FIG. 1A.

Figure 2A:
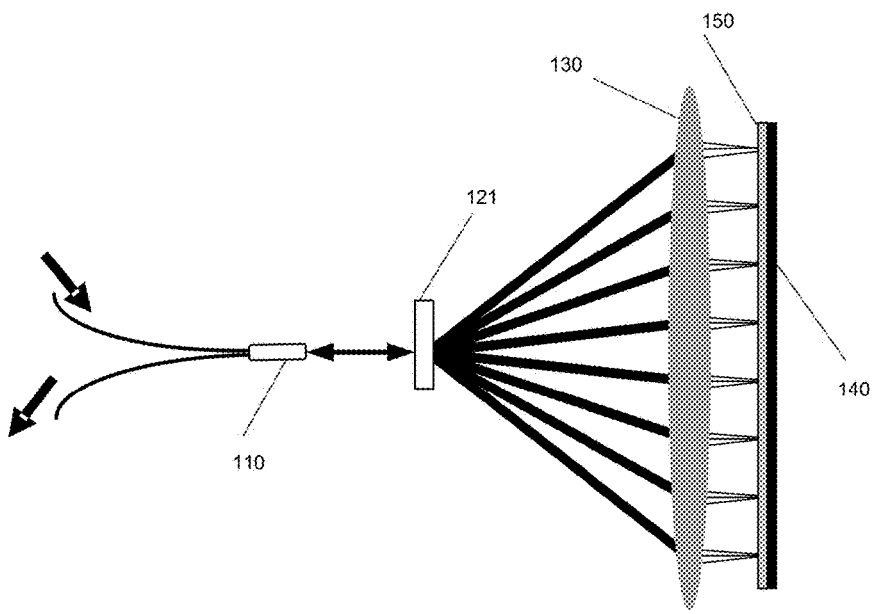
FIG. 2A illustrates an embodiment of a self-fit filter with a pass through grating, x-view.
Figure 2B:
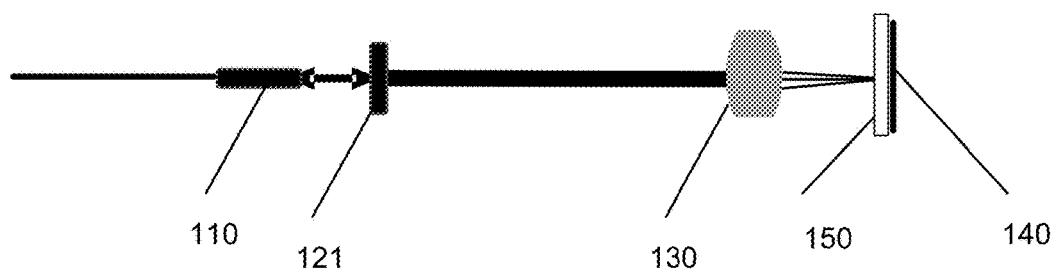
FIG. 2B is a schematic representation of the embodiment illustrated in FIG. 2A, y-view.

The demultiplexing component may be a diffraction grating, implemented either as a reflective component illustrated in the grating 120 (FIG. 1), or as a transmissive component illustrated in a grating 121 (FIGS. 2A and 2B). In one embodiment, the demultiplexer may be a dispersive prism.

Figure 3:
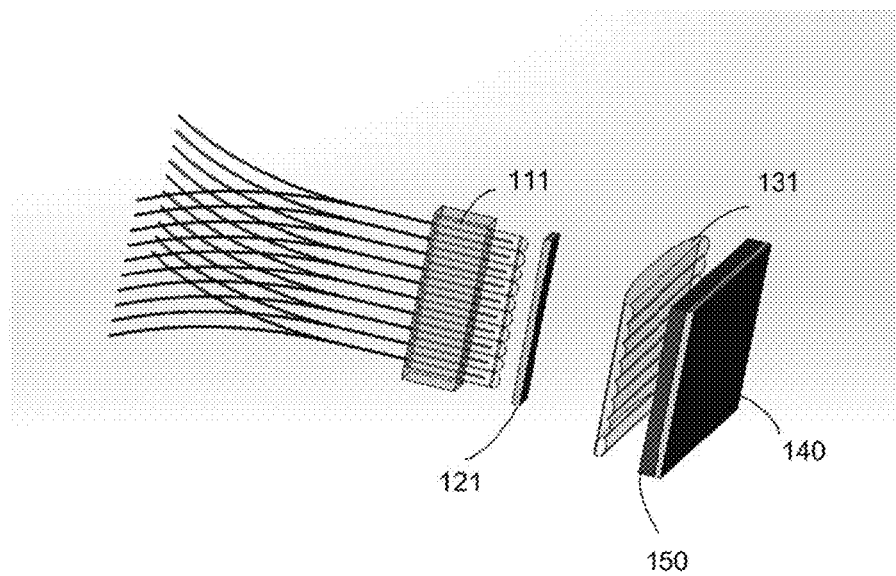
FIG. 3 is a 3D representation of a 10 self-fit filter array.

From the demultiplexer the sub-beams may be directed to one or more lenses, disposed so as to receive the dispersed sub-beams from the demultiplexing component, and further to the reflector. FIGS. 1-3 show a lens 130 (or lens 131) and a reflector 140.

Figure 4:
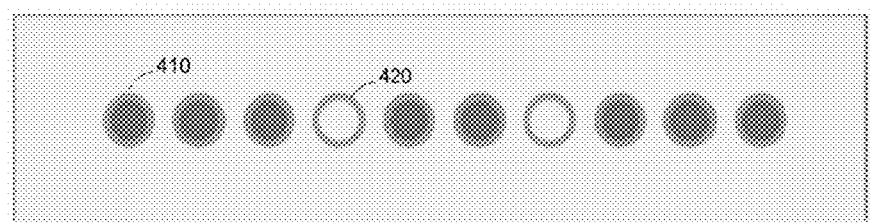
FIG. 4 is a schematic representation of beam absorption in a saturable absorber.

Preferably, the sub-beams are focused on the surface of the saturable absorber by the lens or lenses disposed along the optical paths of the sub-beams following the demultiplexer (e.g. grating). Each of the sub-beams is ideally focused to a point, in order to minimize the beam spot area, because high power intensity is desired to saturate the absorber. A variety of designs including one or more lenses may be used for this purpose, such as a cylindrical lens which focuses each sub-beam into a spot along a line as illustrated in FIG. 4. To summarize, the lens(es) disposed along the optical paths of the sub-beams after the demultiplexing component (e.g. grating) and before the SA preferably focus the sub-beams substantially at the saturable absorber; i.e. on or about the surface of the SA, so as to increase the intensities of the sub-beams at the surface of the absorber. In the embodiments including a reflector behind the SA, as discussed above, the lens(es) may also direct the sub-beams normal to the surface of the reflector.

Figure 3A:
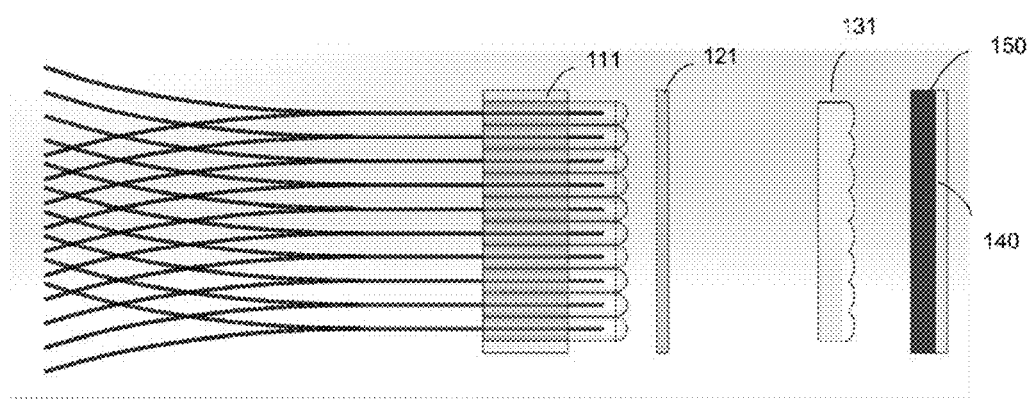
FIG. 3A illustrates the 10 self-fit filter array of FIG. 3, x-view.
Figure 3B:
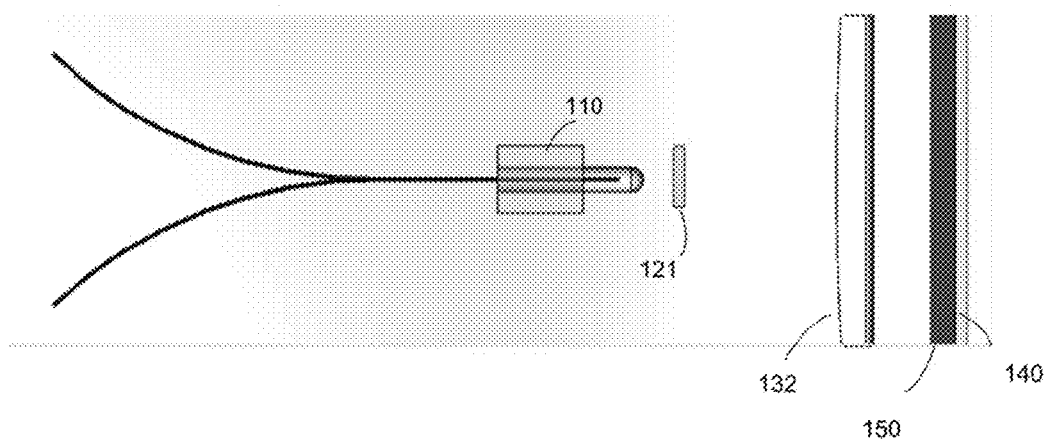
FIG. 3B illustrates the 10 self-fit filter array of FIG. 3, y-view.

With reference to FIGS. 3 and 3A, the filter may include an array of lenses 131, so that each lens is disposed to receive a collimated beam of light from one of the collimators within the collimator array 111. The array of lenses may be an integral component with a wavy surface illustrated in the integrated lens array 131 in FIGS. 3 and 3A. Alternatively, the lens array may be formed of multiple lenses each disposed to receive one or more collimated beams from one or more collimators in the array 111. FIG. 3B illustrates a lens portion 132, which may be a portion of the lens array 131 or of the lens 130 (FIG. 2), wherein the lens or lens array continue beyond the drawing; the lens portion receives a collimated beam from the collimator 110 (FIG. 3B) which is part of the collimator array 111 (FIG. 3A). Each of the lenses described herein may be used together with any demultiplexing component, either reflective or light transmissive, e.g. with light transmissive gratings or with reflective gratings illustrated by the gratings 121 (FIG. 3) and 120 (FIG. 1A), respectively.

The reflector may include a reflective metal, such as Aluminum or Silver. Alternatively, the reflector may be a layered mirror formed of dielectric and/or semiconductor layers.

The reflector is disposed so that the sub-beams directed towards the mirror are normal to the reflector and, when reflected, propagate back along the optical path of the incident light. The reflector and the lens(es) ensure that the sub-beams are reflected back along their respective optical paths. A variety of configurations may be used, including a curved reflector and a cylindrical lens, a flat reflector and a combination of two lenses: a cylindrical lens for focusing the sub-beams on or close to the SA surface and another lens for making the sub-beams parallel one another and normal to the surface of the reflector. In one embodiment, the lens may be Gradient-index (GRIN) lens. A combination of several lenses may be used for the same purpose.

The optical filter further includes a saturable absorber between the lens and the mirror. With reference to FIGS. 1-3, a saturable absorber 150 is disposed between the lens 130 and the reflector 140.

Saturable absorbers are optical components which become more transparent with increasing intensity of the incident light, at least for a particular range of wavelengths. For light having wavelength(s) within the particular interval, a saturable absorber absorbs light at low light intensity levels, whereas at high light intensity levels the saturable absorber stops absorbing light and becomes substantially transparent after initially absorbing an amount of light for it to become saturated.

A saturable absorber absorbs optical power with a coefficient that varies dependent on the wavelength and the intensity of a light beam. The intensity of light is power per a unit area. The coefficient of absorption is the rate of decrease in the intensity of light as it passes through the absorber. In other words, the coefficient is the fraction of incident radiant energy absorbed per unit thickness of the absorber. For a particular range of wavelengths, the saturable absorber may have very small absorption when the intensity is higher than the saturation threshold intensity (at which the absorption saturates) and very high absorption with intensity much lower than the threshold intensity.

The saturable absorber (SA) may include semiconductor or doped glass. For example, a saturable absorber may include thin semiconductor layers. The saturable absorber may include chromium-doped yttrium aluminium garnet (Cr:YAG) or spinel doped with cobalt. The saturable absorber can be based, for example, on an InAs/AlSb multiple quantum well grown on a GaSb substrate. In particular, InAs/AlSb is well suited for the 1550 band (1520-1620 nm). However, other saturable absorbers such as graphene or carbon nano-tube based absorbers well known in the art can also be implemented.

The saturable absorber and the reflector, illustrated by components 150 and 140 in FIGS. 1-3, may be implemented together e.g. in the form of a saturably-absorbing reflector which includes a reflector and a saturable absorber in front of the reflector. The saturable absorber may be part of a semiconductor saturable absorber mirror (SESAM), which may include a single quantum well absorber layer.

In a saturable absorber, a coefficient of absorption, which is a rate of decrease in the intensity of light as it passes through an absorber, depends on intensity of light, the greater intensity—the lesser absorption. For the continuous-wave operation, the absorption A may be described as follow:

$$A=\alpha/(1+I/I_0),$$

wherein I is the intensity of incident light, $I_0$ is a constant, and a is the coefficient of absorption which depends on intensity of light; $\alpha=\alpha(I)$.

The innate property of a saturable absorber (SA) is to saturate the absorption. A saturable absorber becomes saturated dependent on intensity of light, at least for light having wavelength within a particular range. The saturation threshold is characterized by the intensity of light at which the abortion saturates.

The SA component may also be described as having two intervals of intensities, above and below of the saturation threshold, such that, for light within said range of wavelengths, in one interval the coefficient of absorption $\alpha(I)$ takes values that are significantly less than values taken in the second interval. The intervals are referred herein as signal and noise intervals, respectively. For certainty, a SA may be characterized by two intervals of intensities, labeled as signal and noise intervals or first and second intervals, respectively, such that for light having wavelength(s) within a particular range, a coefficient of absorption for any sub-beam with intensity within the first interval of intensities is at least four times less than a coefficient of absorption for any sub-beam with intensity within the second interval of intensities, wherein the first interval is above the saturation threshold and the second interval is below the saturation threshold.

While the saturation threshold intensity may depend on the wavelength of the incident light, the dependency is practically negligible. Nevertheless, accounting for possible dependency, the saturation of absorption may be described as above, understanding that the first interval of intensities is above the maxim of saturation threshold intensities over various wavelengths within the range, and the second interval of intensities is below the minimum of saturation threshold intensities over various wavelengths within the range.

To summarize, the coefficient of absorption takes values that are at least K times less for light in the signal interval than the coefficient of absorption values for light in the noise interval, wherein K may be 4 and preferably 10. By way of example, saturable absorber based on InAs/AlSb has a saturation threshold for light having wavelength(s) within the 1550 nm band (1520-1620 nm). The ratio of absorbed power in the two intervals, one above the threshold and another below the threshold, may be at least 6 dB, and preferably more than or equal to 10 dB.

By varying the material composition and design parameters, e.g. thickness of the layer(s), the absorbing properties of the saturable absorbers may be tailored for operation in very different regimes. By way of example, commercially available software, such as the "RP Coating" by RP Photonics Consulting GmbH, Bad Dürrheim, Germany, allows to design a SA component with desired properties. For the method and devices described herein, the saturable absorber is preferably a passive component. However, a static bias (voltage) may be applied in order to adjust the saturation threshold.

The saturable absorber may be designed for light having wavelength(s) within a particular range of wavelengths, so that the saturable absorber may has a saturation threshold between the intensity values of communication channels that have to pass through the saturable absorber may and those that are desired to be cleaned. In other words, the absorber component may be designed so that, for a particular range of wavelengths, e.g. the 1550 nm band (1520-1620 nm), within the signal interval of intensities, the coefficient of absorption α takes values which are at least four times less than values taken by the coefficient of absorption if the intensity of incident light is within the noise interval. Preferably, the ratio of a in the two intervals is greater than or equal to 10. Preferably, the particular range of wavelengths where the absorption of the SA component saturates covers one of the DWDM communication ranges shown in Table 1, or at least a portion of one of the DWDM communication ranges.

TABLE 1

| DWDM Band Wavelength Range | | |
|---|---|---|
| Band Name | Wavelengths | Description |
| O-band | 1260-1360 nm | Original band. PON upstream |
| E-band | 1360-1460 nm | Water peak band |
| S-band | 1460-1530 nm | PON downstream |
| C-band | 1530-1565 nm | Lowest attenuation, original DWDM band, compatible with fiber amplifiers, CATV |
| L-band | 1565-1625 nm | Low attenuation, expanded DWDM band |
| U-band | 1625-1675 nm | Ultra-long wavelength |

By way of a not limiting example, a SA component based on InAs/AlSb may have a saturation threshold intensity of about 0.01 mw per square millimeter for light within the 1550 nm band (1520-1620 nm), and have the signal interval around 0.1 mw per square millimeter, and the noise interval around 0.001 mw per square millimeter.

In operation, the filter may receive a signal from a WDM system, the signal possibly including multiple channels, some of which may be missing channels with only remnants of the previously dropped signal. The optical demultiplexing component and the lens separate the channels in space so that they pass through different portions in the saturable absorber. In other words, for each two channels of the WDM system, one channel goes through and/or is absorbed by a first portion of the saturable absorber different from a second portion of the saturable absorber therein another of the two channels goes through and/or is absorbed by, wherein the coefficient of absorption of a particular sub-beam depends on the sub-beam's intensity. Those of the dispersed sub-beams that have been filtered through the saturable absorber, i.e. not completely absorbed, may be referred to as filtered sub-beams.

Referring to FIG. 4, signals/channels with different wavelengths are incident on the absorber at different areas and, thus, pass through different volume portions of the absorber. Channels with a signal therein are illustrated by the dark spots 410, and "missing" channels that have no signal or only remnants of a dropped signal are represented by white spots 420. In other words, FIG. 4 illustrates cleaning of missing channel(s).

The saturable absorber may be designed so that, for channels with a signal therein, the intensity level is higher than the saturation threshold and the loss is very small. The "missing" channels may still have some power, possibly caused by insufficient isolation of the channels. The intensity of light in missing channels is very low, significantly below the saturation threshold of the saturable absorber. Therefore the absorption of those channels is very high, which also means high loss of the remaining power in those channels. In other words, the saturable absorber at least partially absorbs one or more low-intensity sub-beams. Other sub-beams, with intensity above the saturation threshold, are substantially unattenuated due to the saturation effect, wherein only a minor portion of the beam intensity is lost for saturating the absorber.

The reflector (mirror) is disposed normal to the sub-beams so that the reflected sub-beams return along the optical path of the spatially dispersed sub-beams incident on the mirror.—Accordingly, each channel goes to the mirror and back though a same portion of the absorber. A low power channel, if it has not been completely absorbed on the way to the mirror, further attenuates in the absorber on its way back from the mirror. A high power channel goes through the previously saturated portion of the absorber, through the portion of the absorber that may still be transparent for the reflected light.

The lens may direct the reflected sub-beams received from the SA to the demultiplexer, which focuses the beams into a resulting output beam. The dual-fiber collimator may receive the output beam and provide an output signal to a fiber.

The dual fiber collimator may serve as an optical isolator so as to isolate the output beam, which includes all the reflected signals, from the input beam formed from the signal received via the input fiber from the WDM system. The collimator may direct the output beam through the output fiber to the system.

In one embodiment, the filter may include multiple collimators e.g. arranged in an array. The rest of the filter may be the same as discussed above. Each collimator, preferably implemented as a dual fiber collimator, may receive its own input signal and direct its own input beam to a demultiplexing component. All collimators in the array may direct the input beams to the same demultiplexing component, which may be a grating or a prism as discussed above, therein the input beams are spatially dispersed by the grating and then refracted by a lens, preferably a cylindrical lens. The filter includes a saturated absorber and a reflector as discussed above.

Figure 1A:
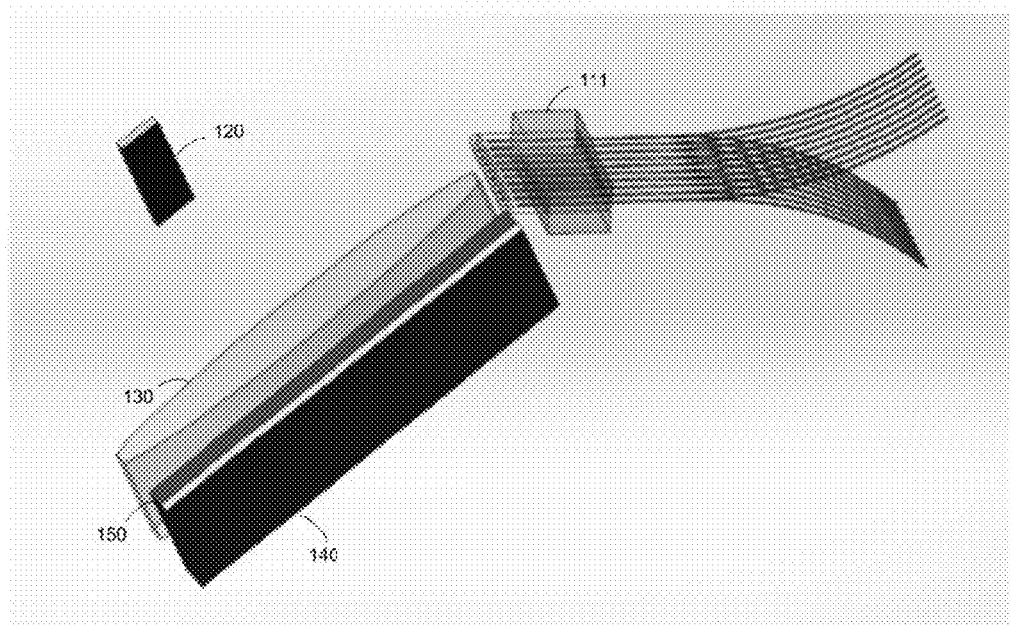
FIG. 1A is a 3D representation of an embodiment of a self-fit filter.

With reference to FIGS. 1A and 3, a filter may include a collimator array 111, a demultiplexing component 120 or 121, a lens 130, a mirror 140, and a saturated absorber 150. It should be appreciated that any of the components described above may be implemented as two or more components performing a same function. By way of example, multiple collimators may direct light to a single diffraction grating, whereas the diffracted beams may be refracted by two or more lenses to a single saturated absorber and a single mirror.

In one embodiment, the reflector has a curved surface, locally normal to the optical paths of the sub-beams, for focusing the reflected sub-beams on the demultiplexing component. Then, the lens 130 may be absent. Alternatively, the curved reflector and the lens(es) 130 may complement one another in making the sub-beams normal to the reflector at the location of incidence.

Advantageously, the optical filters disclosed herein can clean remaining power of missing channel(s) in a WDM optical system. The remaining power of missing/dropped channel(s) may be cleaned by the filters without any control circuits such as a wave blocker. The optical filters disclosed herein are cost-efficient and convenient to use optical circuits. The filters may be configured to work in a wide range of wavelengths, in particular, those used in WDM systems, within the range of 1000-1700 nm, and especially within the range of from 1520 to 1620 nm.

Figure 5A:
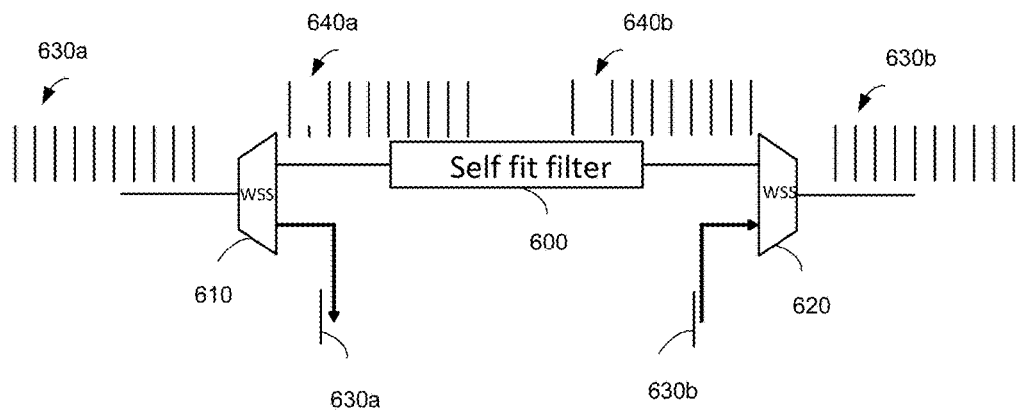
FIGS. 5A and 5B illustrate the use of a filter in an optical system.
Figure 5B:
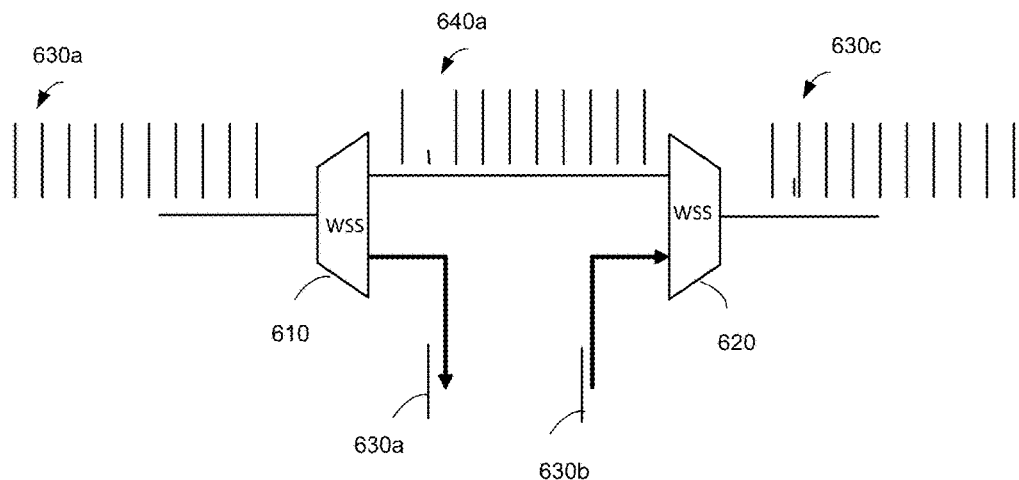

With reference to FIG. 5A, WSS 610 and 620 in a ROADM system may be used to drop and then add a particular wavelength 630a and 630b. After the WSS 610 drops the wavelength 630a, there is still remaining power in the channel indicated by the short line 640a. The self-fit cleaning filter 600 cleans only the low power channel as indicated by no line in the position 640b. The other high-power channels are practically not affected. The WSS 620 adds the channel 630b to the output signal, advantageously avoiding cross talk, which could have been caused by the power remnants 640a in the absence of the filter 600, which may be any of the self-fit filters disclosed herein. FIG. 5B illustrates conventional use of the WSS 610 and 620 without the filter 600. With limited isolation, there will be cross talk 630c.

Figures 6A, 6B:
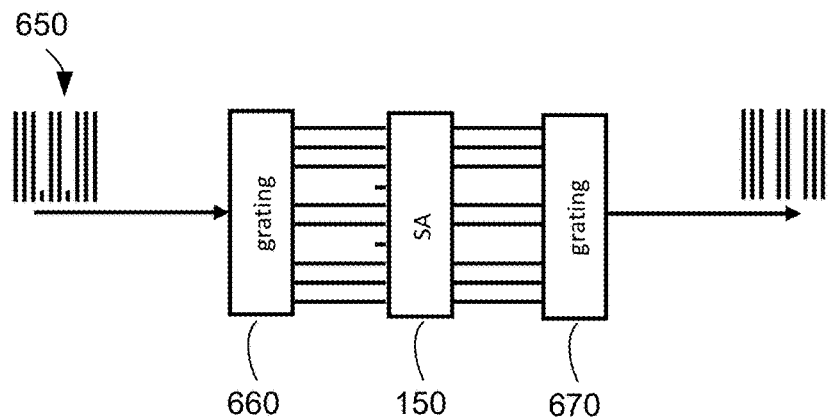
FIG. 6A is a functional diagram of an optical filter.
FIG. 6B is a flow chart of a method of filtering optical signals in a WDM system.

FIG. 6A presents a functional diagram of an optical filter. The multi wavelength input 650 includes wavelength(s) having very low power. The input light is separated in space according to wavelength by a first demultiplexing component 660. The saturable absorber 150 attenuates wavelengths with low power and conveys wavelengths with high power to the second demultiplexing component 670 which is used as a mux. The demultiplexing components 660 and 670 are preferably diffraction gratings, and may be any of the demultiplexing components discussed herein, in particular with reference to FIGS. 1-3. Additionally, the demultiplexing components 660 and 670 may be implemented as a single component if the filter includes a mirror behind the saturable absorber.

Accordingly, FIG. 6A illustrates a method of filtering optical signals in an optical system, such as a WDM system. FIG. 6B is a flow chart of the method, which includes the following steps:

(a) Demultiplexing an input beam into a plurality of sub-beams having distinct center wavelengths.

(b) At least partially absorbing one or more of the plurality of sub-beams by using a saturable absorber, wherein for light having wavelengths within a particular range, the saturable absorber has a saturation threshold and a coefficient of absorption of the saturable absorber for any sub-beam with intensity within a signal interval of intensities is at least four times less than a coefficient of absorption for any sub-beam with intensity within a noise interval of intensities, wherein the signal interval is above the saturation threshold and the noise interval is below the saturation threshold. The low-intensity sub-beam(s) incident on the absorber may be substantially absorbed, or at least partially absorbed in the saturable absorber. Other sub-beam(s) incident on the saturable absorber, with intensity above the saturation threshold, pass through the absorber substantially unattenuated due to the saturation effect.

(c) Multiplexing the sub-beams into an output optical signal, also referred herein as an output light beam.

In step (a), the input beam is preferably a collimated beam. Thus, step (a) may include collimating the input optical signal so as to form a collimated beam. The method may be used for a wide range of wavelengths, in particular, those used in WDM systems, within the range of 1000-1700 nm, and especially within the range of from 1520 to 1620 nm.

The method may be implemented in the self-fit filters disclosed herein. Step (c) may include reflecting the plurality of sub-beams with a reflector, back along optical paths of the plurality of spatially dispersed sub-beams incident on a reflector. For this purpose, the method may include ensuring that the plurality of sub-beams are normal to the reflector. The reflector may have a curved surface and/or one or more lenses may be used for refracting the sub-beams between the reflector and the demultiplexer. In one embodiment, a lens directs the plurality of sub-beams substantially parallel one another and normal to the reflector.

The method may be implemented in a Wavelength Selective Switch (WSS) including a demultiplexer array (De-Mux), a switch array, and an output multiplexer (Mux) array, wherein the saturable absorber is disposed between the switch array and the Mux array. The DeMux may include a diffraction grating.

The saturable absorber has been discussed above, and may be such that a coefficient of absorption for any beam with intensity within the signal interval is at least four times less, and preferably ten times less than a coefficient of absorption for any beam with intensity within a noise interval.

Figure 7:
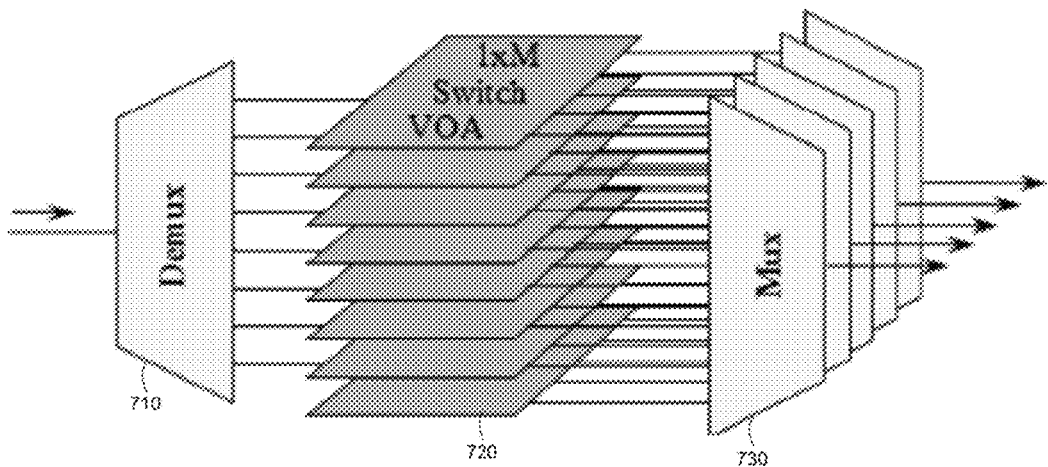
FIG. 7 is a schematic representation of a conventional WSS.

With reference to FIG. 7, a wavelength selective switch (WSS) is designed to individually switch each wavelength to the desired out port. The WSS includes three main functional blocks: Input Demux 710, Switch array 720, and output Mux array 730. The input Demux separates wavelengths of the multi wavelength input in space. Each wavelength is switched to the desired output Mux, thus enabling wavelength selective switching. The input Demux preferably includes a diffraction grating. The Switch array may be based on movable mirrors using Micro-Electro-Mechanical Systems (MEMS) or Liquid Crystals on Silicon (LCOS). The output Mux may be another diffraction grating. A variety of implementations for the Input Demux 710, Switch array 720, and output Mux array 730 are commercially available. In principle, a WSS may be considered as a multi self fit filter array, except for the reflector. Instead of the fixed reflector used in self fit filter, the WSS may include a beam steering device, such as a MEMs mirror, or LCOS, which reflects light to an output collimator. The MUX/DeMUX in WSS may be same as that in the self fit filter. In practice, one piece grating works as multiple MUX/DeMUX.

Ideally, when a particular wavelength is selected, other undesirable wavelengths should be fully blocked. In other words, an ideal WSS has infinite isolation. However, real wavelength selective switches have limited isolation resulting in the crosstalk effect.

In practice, a conventional optical switch cannot switch all power of a wavelength to a desired port. There is still some power sent to other port(s). By inserting a layer of saturable absorption material, which has very low absorption when light intensity is above the saturation threshold and very high absorption for light intensity much lower than the threshold, between the switch and Mux, the remaining power is significantly reduced, so that isolation of the channels is enhanced. The saturable absorption material may be designed to have desired properties as discussed elsewhere herein.

Implementing the method disclosed herein, an isolation-enhanced wavelength selective switch may include a saturable absorber, which blocks wavelengths with lower power level and transfers wavelengths with higher power level with almost no loss as disclosed herein, may be used to remove or at least significantly reduce the crosstalk, so as to improve isolation of channels within the WSS.

Figure 8:
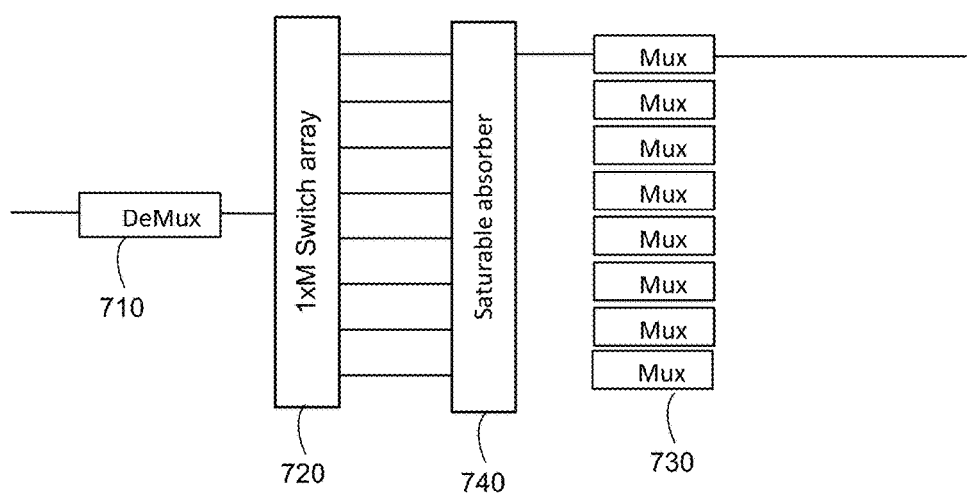
FIG. 8 is a schematic representation of an isolation enhanced WSS including a saturable absorber.

With reference to FIG. 8, the isolation-enhanced WSS may include a demux 710, a switch array 720, an output Mux array 730, and a saturable absorber 740 between the switch array 720 and the output Mux array 730. The saturable absorber 740 may be such as the absorber described herein and illustrated in the component 150. In the isolation-enhanced WSS, the saturable absorber 740 performs the same function as in the self-fitting cleaning filter, cleaning the remaining power in missing channels.

Figure 9:
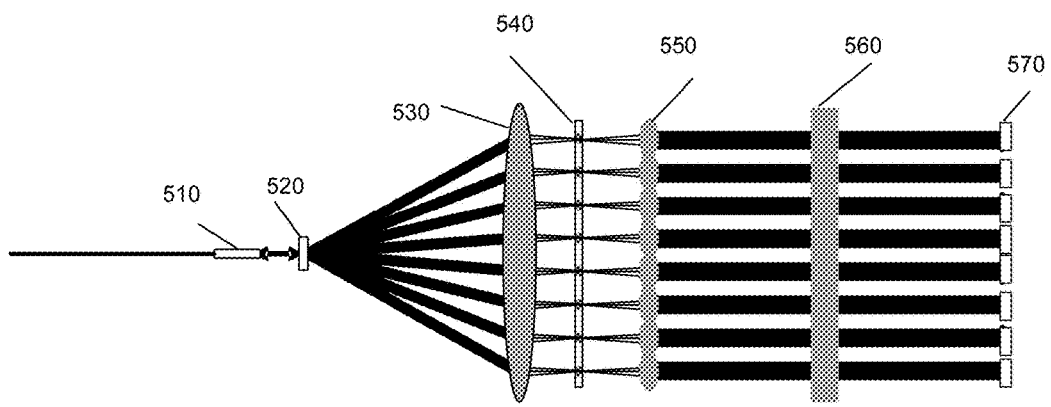
FIG. 9 is a schematic representation of a 1×4 isolation enhanced Wavelength Selective Switch, x-view (dispersion plan); and, FIG. 10 is a schematic representation of the 1×4 Wavelength Selective Switch of FIG. 9, y-view (switch plan).
Figure 10:
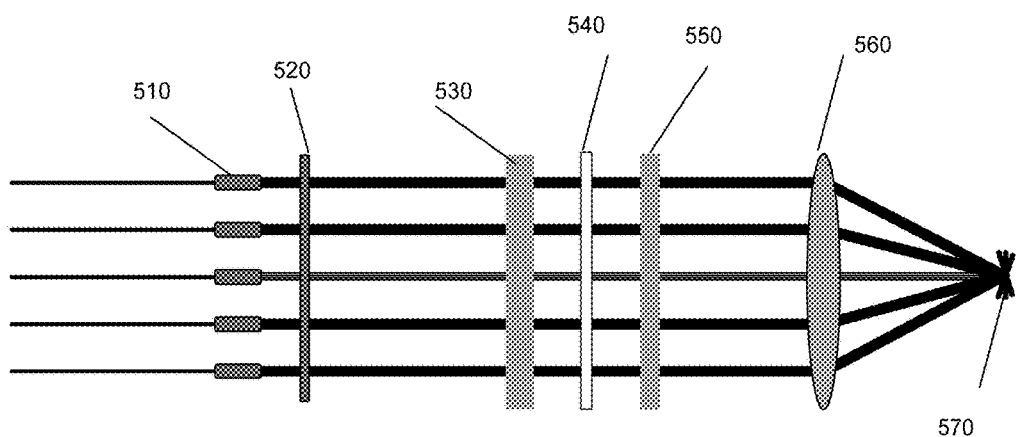

FIGS. 9 and 10 illustrate a 1×4 isolation enhanced Wavelength Selective Switch, a same device viewed from two different directions: FIG. 9 shows the x-view (dispersion plan), and FIG. 10—y-view (switch plan). The isolation enhanced WSS includes a fiber collimator array 510, a demultiplexer (preferably a grating) 520, a saturable absorber 540, lenses 530, 550 and 560, and a beam steering mirror array 570. The components of the switch illustrated in FIGS. 9 and 10 may be as those described above.

To summarize, the method disclosed herein with reference to FIG. 6B may be implemented in a variety of optical circuits, including the self-fit optical filter and the isolation-enhanced WSS. An optical circuit implementing the method includes a demultiplexer and a saturably-absorbing circuit. The demultiplexer is disposed to receive an input light beam for spatially dispersing the input light beam into a plurality of sub-beams, dependent on wavelengths. The demultiplexer preferably includes a diffraction grating, possibly an array of gratings, such as Arrayed-waveguide gratings (AWG). The demultiplexer may be prism, etc. The saturably-absorbing circuit, or block, is disposed to receive the plurality of sub-beams for forming an output beam and necessarily includes a saturable absorber (SA) such as discussed above. The SA has a saturation threshold, and a coefficient of absorption for any sub-beam with intensity within a signal interval of intensities is at least four times less than a coefficient of absorption for any sub-beam with intensity within a noise interval of intensities, wherein the signal interval is above the saturation threshold and the noise interval is below the saturation threshold. The saturably-absorbing circuit also participates in forming an output beam. The SA circuit may include a multiplexer disposed to receive the plurality of sub-beams for combining the plurality of sub-beams into the output beam. Alternatively, the SA component may include a reflector for reflecting the plurality of sub-beams back along their optical paths, wherein the demultiplexer combines the plurality of sub-beams into the output beam, While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

The invention claimed is:

1. An optical circuit comprising:
a demultiplexer disposed to receive an input light beam for spatially dispersing the input light beam into a plurality of sub-beams, dependent on wavelengths; and,
a saturably-absorbing circuit disposed to receive the plurality of sub-beams for forming an output beam, comprising:
a saturable absorber, wherein the saturable absorber becomes saturated dependent on intensity of light, at least for light having wavelength within a particular range, so that a coefficient of absorption for any sub-beam with intensity within a first interval of intensities is at least four times less than a coefficient of absorption for any sub-beam with intensity within a second interval of intensities, wherein the first interval is above the saturation threshold and the second interval is below the saturation threshold, and
either a reflector for reflecting the plurality of sub-beams back along their optical paths, wherein the demultiplexer combines the plurality of sub-beams reflected by the reflector into the output beam, or a multiplexer disposed to receive the plurality of sub-beams for combining the plurality of sub-beams.

2. The optical circuit defined in claim 1, wherein the multiplexer or the demultiplexer comprises a diffraction grating.

3. The optical circuit defined in claim 2, wherein the diffraction grating is a reflective element.

4. The optical circuit defined in claim 1, wherein the multiplexer comprises an arrayed-waveguide grating (AWG).

5. The optical circuit defined in claim 1, further comprising a collimator for collimating input light into the input light beam.

6. The optical circuit defined in claim 5, wherein the collimator is a dual fiber collimator.

7. The optical circuit defined in claim 1, comprising an array of collimators for collimating input light into a plurality of light beams comprising the input light beam.

8. The optical circuit defined in claim 1, further comprising a cylindrical lens for refracting the plurality of sub-beams on their optical paths from the demultiplexer to the reflector.

9. The optical circuit defined in claim 1, wherein the reflector has a curved surface so as to focus reflected sub-beams on the demultiplexer.

10. The optical circuit defined in claim 1, wherein the device is a WSS comprising a demultiplexer array (DeMux), a switch array, and an output multiplexer (Mux) array, wherein the saturable absorber is disposed between the switch array and the Mux array.

11. The optical circuit defined in claim 1, wherein the saturable absorber is such that a coefficient of absorption for any beam with intensity within the first interval is at least ten times less than a coefficient of absorption for any beam with intensity within the second interval.

12. The optical circuit defined in claim 1, comprising:
a dual fiber collimator for collimating input light so as to form the input light beam,
wherein the demultiplexer comprises a diffraction grating disposed to receive the input light beam for spatially dispersing the input light beam into the plurality of sub-beams, dependent on wavelengths; and,
a cylindrical lens for focusing each of the plurality of sub-beams substantially at the saturable absorber;
wherein the reflector reflects the plurality of sub-beams back along their optical paths, and wherein the dual fiber collimator combines the plurality of sub-beams into an output light beam.

13. The optical circuit defined in claim 12, wherein the saturable absorber is such that a coefficient of absorption for any sub-beam with intensity within the first interval is at least ten times less than a coefficient of absorption for any sub-beam with intensity within the second interval.

14. The optical circuit defined in claim 1, wherein the demultiplexer comprises an AWG.

* * * * *